UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

1,051,856. Specification of Letters Patent. Patented Feb. 4, 1913.

No Drawing. Application filed April 5, 1912. Serial No. 688,770.

*To all whom it may concern:*

Be it known that we, WILHELM BAUER, residing at Vohwinkel, and ALFRED HERRE and RUDOLF MAYER, residing at Elberfeld, Germany, doctors of philosophy, chemists, citizens of the German Empire, have invented new and useful Improvements in Vat Dye, of which the following is a specification.

Our invention relates to the manufacture and production of new and valuable vat dyestuffs. They are obtained by condensing isatin derivatives in which the oxygen of the alpha-keto group is replaced by easily movable or replaceable substituents, *e. g.* halogen, sulfur, the amino group, the alkoxy group, with carbazol compounds, especially carbazol and its halogen substituted derivatives.

The new dyes are in a dry state dark violet crystalline powders with a metallic luster which are soluble in hot chlorobenzene generally with a violet coloration, and which yield with hydrosulfite and caustic soda lye vats dyeing cotton after exposure to air red to violet shades remarkable for their fastness to chlorin.

In order to illustrate the new process more fully we can proceed as follows, the parts being by weight:—305 parts of dibromoisatin are converted in a dry benzene suspension into dibromoisatin chlorid by heating it with 220 parts $PCl_5$. The mixture thus obtained is after cooling poured into a hot solution which is well stirred of 180 parts of carbazol in 3,000 parts of dry chlorobenzene. The stirring is continued for a short time and the dye which separates on cooling is filtered off and washed. It is a violet crystalline powder with a metallic luster melting at 269° C. soluble in hot chlorobenzene with a violet and in concentrated sulfuric acid with a greenish-blue coloration. It yields with hydrosulfite and NaOH a yellow vat from which cotton is dyed yellow changing on exposure to air into a fast deep Bordeaux-red fast to chlorin.

The formation of the new dye may be illustrated by the following graphic equation.

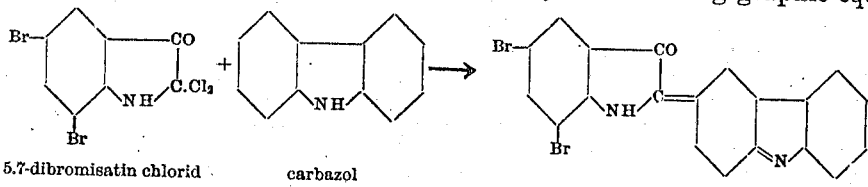

5.7-dibromisatin chlorid       carbazol

Other carbazol compounds may be used, *e. g.* chlorocarbazol, bromocarbazol, dichlorocarbazol; and instead of the above isatin derivatives others may be used, *e. g.* isatinchlorid, chloro-, bromo-, chlorobromo- or dichloro-isatinchlorid, ortho-bromo-para-methylisatin-chlorid, tri-bromo-isatinchlorid, para-bromo-ortho-methyl-isatinchlorid, etc.

We claim:—

1. The new dyestuffs being condensation products of isatin derivatives in which the oxygen of the alpha-keto group is replaced by easily replaceable substituents and a carbazol compound, which dyestuffs are in a dry state crystalline powders with a metallic luster which are soluble in hot chlorobenzene generally with a violet coloration, and which yield with hydrosulfite and caustic soda lye vats dyeing cotton after exposure to air red to violet shades remarkable for their fastness to chlorin, substantially as described.

2. The new dyestuffs being condensation products of a halogen-substituted isatin derivative in which the oxygen of the alpha-keto group is replaced by easily replaceable substituents and a carbazol compound, which dyestuffs are in a dry state crystalline powders with a metallic luster which are soluble in hot chloro-benzene generally with a violet coloration, and which yield with hydrosulfite and caustic soda lye vats dyeing cotton after exposure to air red to violet shades remarkable for their fastness to chlorin, substantially as described.

3. The new dyestuffs being condensation products of a poly-halogen-substituted isatin derivative in which the oxygen of the alpha-keto group is replaced by easily replaceable substituents and a carbazol compound, which dyestuffs are in a dry state crystalline powders with a metallic luster which are soluble in hot chloro-benzene generally with a violet coloration, and which yield with hydrosulfite and caustic soda lye vats dyeing cotton after exposure to air red to violet shades remarkable for their fastness to chlorin, substantially as described.

4. The new dyestuffs being condensation products of a di-halogen-substituted isatin derivative in which the oxygen of the alpha-keto group is replaced by easily replaceable substituents and a carbazol compound, which dyestuffs are in a dry state crystalline powders with a metallic luster which are soluble in hot chloro-benzene generally with a violet coloration, and which yield with hydrosulfite and caustic soda lye vats dyeing cotton after exposure to air red to violet shades remarkable for their fastness to chlorin, substantially as described.

5. The new dyestuffs being condensation products of a bromo-halogen-substituted isatin derivative in which the oxygen of the alpha-keto group is replaced by easily replaceable substituents and a carbazol compound, which dyestuffs are in a dry state crystalline powders with a metallic luster which are soluble in hot chloro-benzene generally with a violet coloration, and which yield with hydrosulfite and caustic soda lye vats dyeing cotton after exposure to air red to violet shades remarkable for their fastness to chlorin, substantially as described.

6. The new dyestuffs having probably the following graphically represented formula

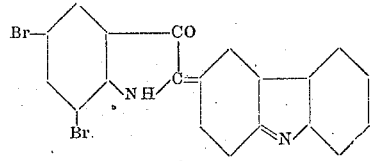

obtainable from dibromoisatin-alpha-chlorid and carbazol, which dyestuff is in a dry state a crystalline powder with a metallic luster melting at 269° C. soluble in hot chlorobenzene with a violet and in concentrated sulfuric acid with a greenish-blue coloration, and which yields with hydrosulfite and caustic soda lye a yellow vat from which cotton is dyed yellow changing on exposure to air into a deep Bordeaux-red remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
HELEN NUFER,
ALBERT NUFER.